June 12, 1928.
J. J. JAKOSKY
1,673,245
PROCESS AND APPARATUS FOR PRODUCING PRINTING INK
Filed Nov. 1, 1926        5 Sheets-Sheet 1
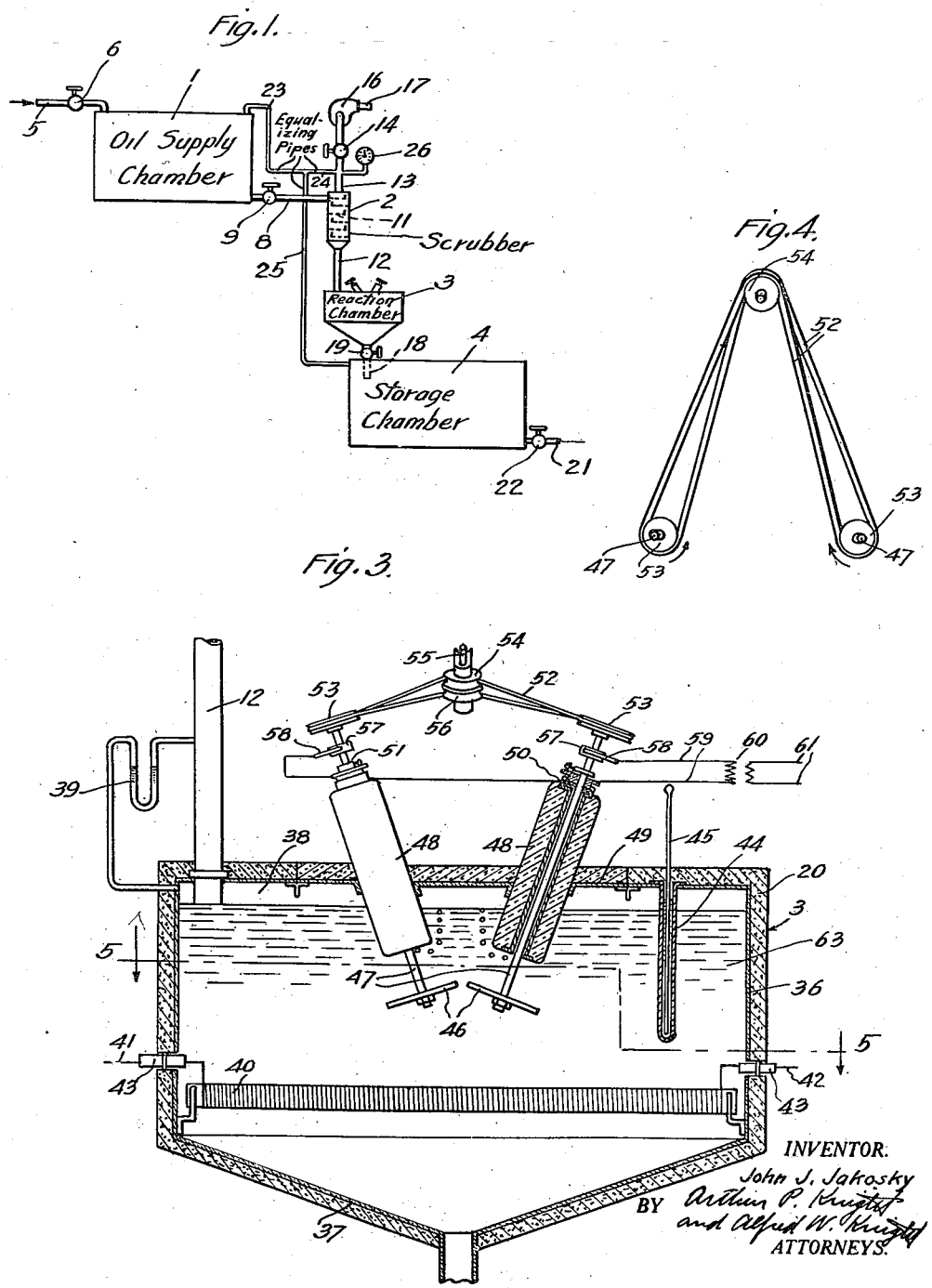

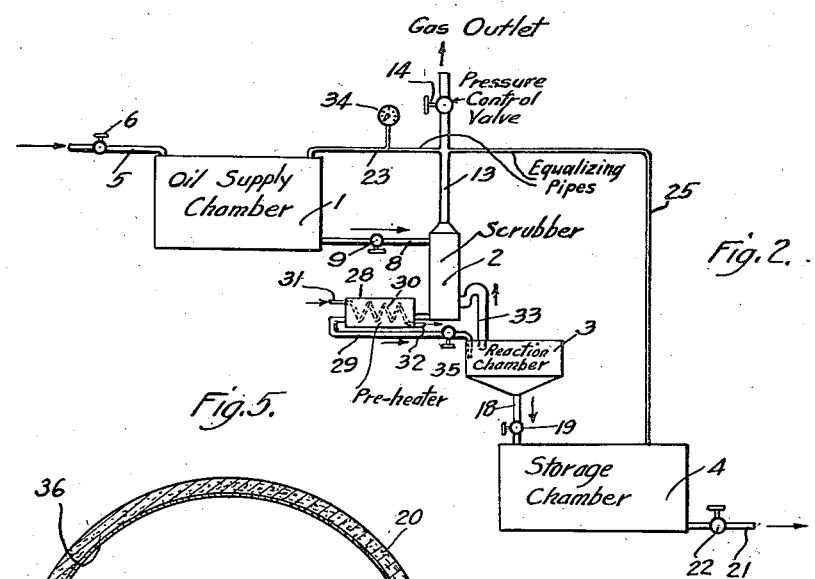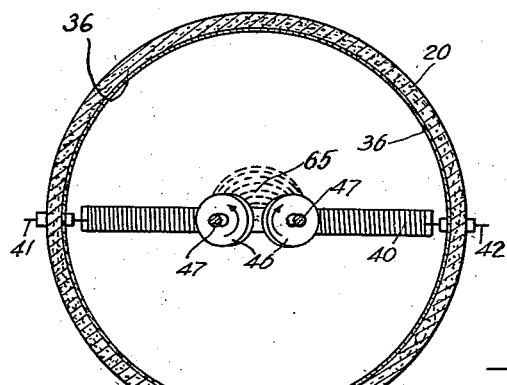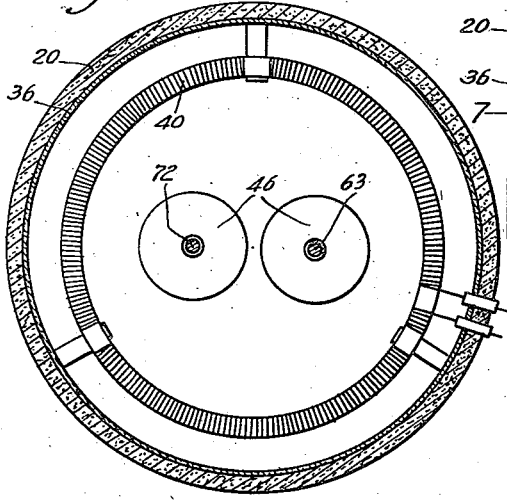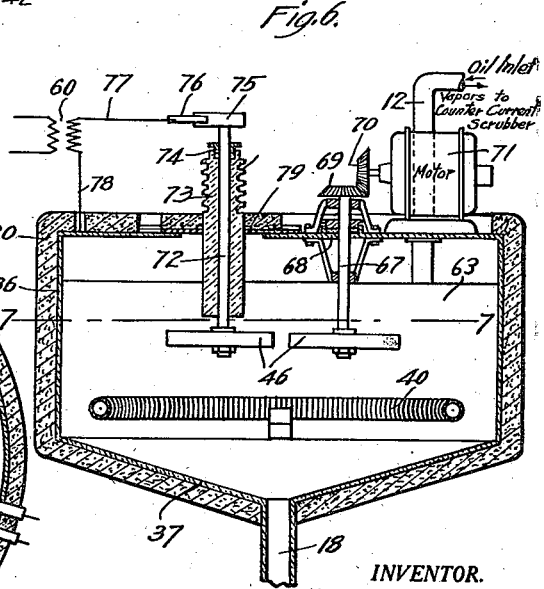

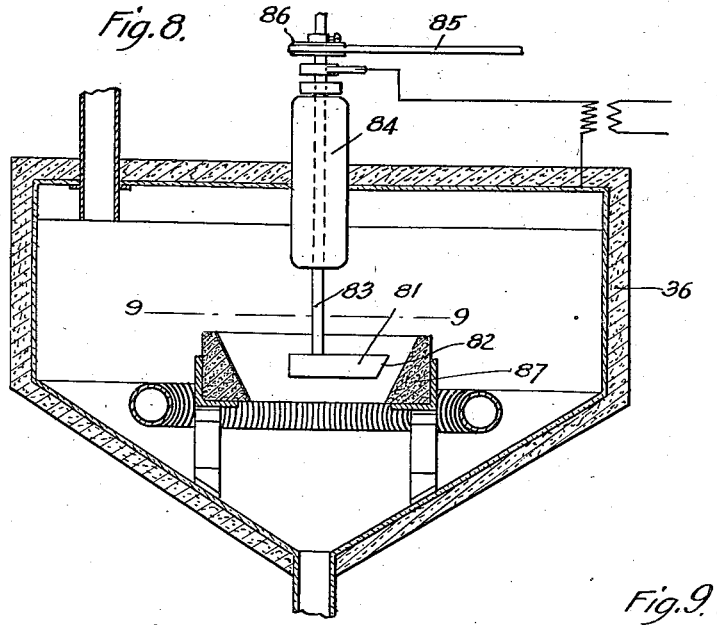
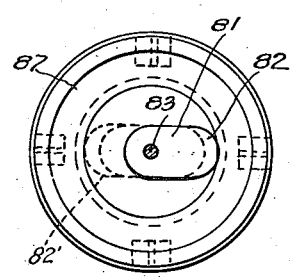
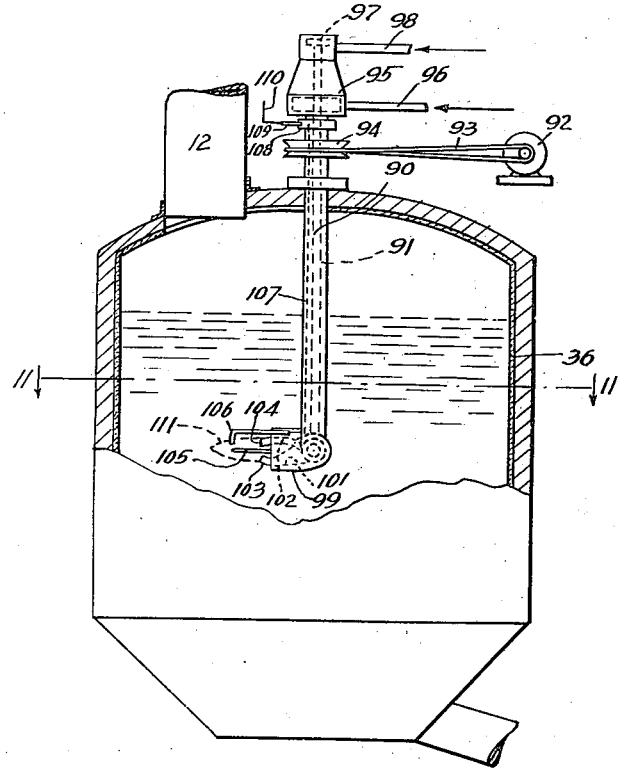

June 12, 1928.

J. J. JAKOSKY 1,673,245

PROCESS AND APPARATUS FOR PRODUCING PRINTING INK

Filed Nov. 1, 1926          5 Sheets-Sheet 4

INVENTOR.
John J. Jakosky
BY
ATTORNEYS.

June 12, 1928.

J. J. JAKOSKY 1,673,245

PROCESS AND APPARATUS FOR PRODUCING PRINTING INK

Filed Nov. 1, 1926 5 Sheets-Sheet 5

INVENTOR.
John J. Jakosky
ATTORNEYS.

Patented June 12, 1928.

1,673,245

UNITED STATES PATENT OFFICE.

JOHN J. JAKOSKY, OF LOS ANGELES, CALIFORNIA.

PROCESS AND APPARATUS FOR PRODUCING PRINTING INK.

Application filed November 1, 1926. Serial No. 145,575.

This invention relates to the production of printing inks consisting of carbon black suspended in a suitable liquid hydrocarbon or other carbon-bearing oil, and the main object of the invention is to produce an ink of this type as simply and as cheaply as possible. The term "carbon-bearing oil" is used herein as meaning an oil whose major constituents contain carbon as a part of their chemical composition.

A particular object of the invention is to provide for the direct production of such ink, as distinguished from present methods of first producing a dry, substantially oil-free carbon black and then mixing the same with the oil which is to be used as a vehicle.

The process which I have devised for this purpose consists essentially, in its preferred embodiment, in heating a hydrocarbon or other carbon-bearing oil which is suitable for use as a vehicle for ink, to such a temperature and under such conditions as to cause rapid, and practically instantaneous, dissociation of a portion of such oil into carbon in the form of carbon black, and hydrogen or other gas; withdrawing the gas as formed, from the oil; and continuing or repeating such treatment until the resulting carbon is present in the oil or in a portion thereof substantially in the proportion required for printing ink, so as to produce a product which may be marketed directly as printing ink. The heating of the oil is preferably accomplished by means of an electric arc, although other methods of heating may be employed, as for example, a high temperature flame such as the oxy-hydrogen flame. Furthermore, the heating to the dissociation temperature is preferably carried out in a localized portion of a body of the oil, whereby a body of oil at a relatively lower temperature is maintained around the region of such localized heating or dissociation, and I prefer to carry out the process in such manner as to cause the products of dissociation (carbon and hydrogen or other gas) to be substantially immediately withdrawn or removed from the dissociation zone into such body of relatively lower temperature oil, so as to quickly cool the carbon below the temperature of dissociation and maintain it substantially in the finely divided and unagglomerated condition in which it is first formed. One effect of this quick cooling of the carbon is to prevent agglomeration which might otherwise occur and which would prevent or seriously interfere with its use as a pigment in printing ink. The carbon black produced in this manner is extremely finely divided and has a high tinting strength, and is otherwise well suited for use in printing, and the term "carbon black" as used throughout this specification will be understood to mean a carbon black having these characteristics. The preferable use of the electric arc for heating to the dissociation temperature and the above-described method of cooling the carbon immediately after formation, have been disclosed and claimed in my United States Patent No. 1,597,277, issued August 24, 1926. The present invention contemplates the application of such methods of dissociation and cooling in a novel process for the direct production of printing ink from oil.

More specifically, the method used according to the present invention includes maintaining a body of a suitable oil at a relatively low temperature; setting up a heating or dissociation zone of the required temperature at a localized position in said body of oil; causing portions of such body of oil to pass through such dissociation zone, resulting in formation of carbon black which is immediately disseminated into the surrounding body of oil and of hydrogen or other gas which also passes off through the oil; repeating such passage of the oil through the dissociation zone or passing it through a second dissociation zone (with or without settling or other thickening action between successive passages) until the oil, or a certain settled or thickened portion thereof, contains substantially the necessary proportion of carbon black for use as printing ink; and then withdrawing, separating, or collecting such oil or such thickened portion thereof containing such proportion of carbon black.

While I have mentioned that the body of oil surrounding the dissociation zone is maintained at a relatively low temperature as compared to the temperature of such zone, it will be understood that such "relatively low temperature" may itself be considerably above normal or atmospheric temperature, as it is only necessary that it be low enough to cool the carbon black quickly to such a point that it will retain substantially its original characteristics. In order, therefore, to increase the fluidity of the body of oil, and also to minimize the amount of heat required in the dissociation zone to heat the oil from the surrounding temperature to the dissociation temperature and hence increase to a maximum the efficiency of utilization of the heat in such zone purely for dissociation purposes, I may in some cases prefer to maintain the body of oil surrounding the dissociation zone at a temperature above normal temperature and just low enough to prevent harmful changes in the characteristics of the carbon black after formation and to also prevent appreciable vaporization of the oil. For this purpose auxiliary heating means may be provided in the body of oil, or in the path of circulation of such oil.

Another feature of my invention in its preferred form, consists in maintaining, both in the dissociation zone and in the body of oil surrounding the same, as low a pressure as can be safely maintained without causing serious volatilization of the oil at the temperature of the surrounding oil body. One purpose of using a pressure of this description is to provide for maximum volume of the hydrogen and other vapor in the dissociation zone and hence for maximum size of arc or high temperature flame.

Practical experience has led me to believe that the dissociation into carbon-black and hydrogen occurs substantially at the surface of the liquid surrounding the high temperature zone, such zone itself being filled with gas consisting principally of hydrogen resulting from dissociation. Assuming that this is the case, it is evident that the rate of dissociation, and hence the efficiency of the process, is dependent on the extent of such surface which in turn depends on the size of the arc or the high temperature flame. Therefore, by maintaining a pressure as above described the maximum liquid surface is exposed to the dissociating action and the maximum efficiency is realized. The use of a pressure as low as possible also increases the rate of dissociation and increases the tendency to formation of hydrogen, methane, and other gaseous products.

Such pressure will of course in most cases be other than atmospheric and may be either sub-atmospheric or super-atmospheric. For example, with heavy oils a pressure as low as one-tenth of an atmosphere (absolute pressure) or less may be employed without causing serious vaporization thereof from the liquid body surrounding the dissociation zone, while with more volatile oils pressures nearer atmospheric pressure, and in some cases even above atmospheric pressure, may be employed. In general, however, I prefer to employ a pressure which is only slightly above the vapor pressure of the most volatile substantial constituent of the oil at the temperature maintained in the body of oil surrounding the dissociation zone.

One modification of the invention conists in the production of higher grade inks for special purposes by first producing a base in accordance with the methods outlined above, such base consisting of carbon black produced by dissociation of, and suspended in, a relatively cheap oil, such as a hydrocarbon oil, and then adding thereto additional oils, dryers, or varnishes, as may be necessary to produce such higher grade ink.

Another step which may be incorporated in the process is that of subjecting the suspension of carbon black in the oil from which it was formed to a grinding operation to grind any lumps or large particles of foreign matter which might be deleterious to the use of such material as printing ink, or to a separating operation to remove hard particles or grit, or to both such grinding and separating operations.

The carbon-bearing oil which is used in the present process must of course be an oil which is capable of holding carbon black in suspension in a finely divided state and which possesses such properties of fluidity, viscosity, volatility, and the like as to render it suitable as a vehicle for printing ink. In some cases, however, when it is desired to use a heavy oil as a vehicle in the ink, it may be found advantageous, in order to increase the fluidity of such oil during its passage through the dissociation zone and other parts of the apparatus, and possibly also in order to increase the production of carbon black, to mix a lighter oil, such as kerosene or the like, with such heavier oil, or to employ a mixture of such oils, subjecting the mixture to dissociation as above described to form a suspension of carbon black therein, and then subjecting the material to distillation so as to remove the lighter oil or a portion thereof, and produce an ink comprising an oil of the desired characteristics with the proper proportion of carbon black therein. When carrying out the process in this manner the lighter fractions distilled off are preferably mixed with a further quantity of heavy oil and returned to the treater. A relatively small quantity of light oil would thus be required, as it could be used over and over again in the process, except for such portion as is decomposed or left in the finished ink.

The invention also comprises certain special apparatus, as hereinafter described, which is particularly advantageous for carrying out some of the processes or operations above mentioned.

The accompanying drawings illustrate certain forms of apparatus according to my invention and referring thereto:

Fig. 1 is a diagrammatic side elevation of one form of apparatus for carrying out the complete process.

Fig. 2 is a similar view of a modified form of such apparatus.

Fig. 3 is a vertical section of one form of reaction chamber for effecting dissociation of the oil.

Fig. 4 is a diagrammatic plan view of the driving means for rotating the electrodes shown in Fig. 3.

Fig. 5 is a horizontal section on line 5—5 in Fig. 3.

Fig. 6 is a vertical section of another form of reaction chamber.

Fig. 7 is a horizontal section on line 7—7 in Fig. 6.

Fig. 8 is a vertical section of another type of reaction chamber.

Fig. 9 is a horizontal section on line 9—9 in Fig. 8.

Fig. 10 is a vertical section of another type of reaction chamber.

Figure 11:
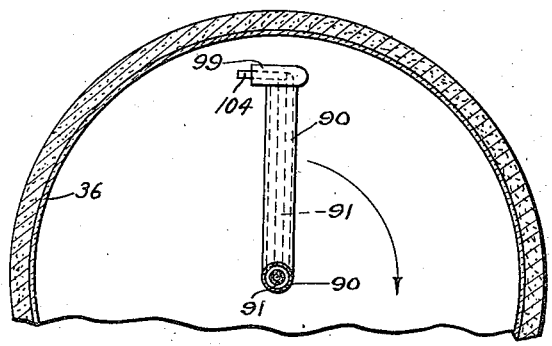
Fig. 11 is a horizontal section on line 11—11 in Fig. 10.

The apparatus shown in Fig. 1 is adapted for carrying out the dissociation of the oil under a condition of partial vacuum or subatmospheric pressure. Such apparatus comprises an oil supply chamber 1, a scrubber 2, a reaction vessel or chamber 3, and a storage or settling chamber 4 for the finished ink. A supply pipe 5 provided with valve 6 leads to supply chamber 1 for supplying thereto the oil to be used in the process. Pipe 8 provided with regulating valve 9 leads from chamber 1 to scrubber 2, said scrubber being adapted to permit downward passage of oil therethrough in such manner as to exert a scrubbing action on the vapors passing upwardly therethrough as hereinafter described. For this purpose said scrubber may be provided with a plurality of horizontal trays 11 disposed one above the other, each of said trays being adapted to maintain a small body or layer of oil thereon and to permit continual overflow of such oil therefrom onto the next lower tray in well-known manner. The pipe 8 is adapted to discharge oil into the scrubber above the uppermost of these trays. Any other suitable type of scrubber may, however, be employed. A pipe 12 leads from the bottom of scrubber 2 to the reaction vessel 3 so as to conduct oil from the scrubber to the reaction vessel and also conduct vapors or gases from the reaction vessel to the scrubber. A gas conducting pipe 13 provided with control valve 14 leads from the top of scrubber 2 to the intake of exhausting fan or vacuum pump 16, whence outlet pipe 17 leads the gases away to the atmosphere or to any suitable point for disposal or further treatment.

Pipe 18 provided with valve 19 leads from the bottom of reaction vessel 3 to the storage chamber 4, and pipe 21 provided with valve 22 leads from the bottom of said storage chamber for conducting the finished ink therefrom to any suitable point for packing, further treatment, or continued storage thereof.

A system of equalizing pipes 23, 24, and 25 may be provided, communicating with one another and also communicating respectively with supply chamber 1, pipe 13, and storage chamber 4, so as to maintain equal conditions of pressure in all parts of the system. A vacuum gage 26 may be provided at any suitable point for indicating the vacuum maintained within the system, said gage being connected, for example to pipe 13 as shown.

The apparatus shown in Fig. 2 is similar to that shown in Fig. 1 but is adapted for carrying out the process at a pressure equal to, or greater than, atmospheric pressure. Said apparatus comprises as before oil supply chamber 1, scrubber 2, reaction chamber 3, ink storage chamber 4, pipes 5, 8, 13, 18, 21, 23, and 25, and valves 6, 9, 14, 19 and 22. In this case I have shown as a further modification the inclusion of a pre-heater 28 in the pipe line 29 leading from the scrubber to the reaction chamber, said pre-heater being provided with any suitable means for heating the oil passing therethrough, such as a heating coil 30 provided with pipes 31 and 32 for circulating a suitable heating medium such as steam therethrough. In this case a separate pipe 33 is provided for conducting the vapors and gases from the reaction chamber to the scrubber. With this form of apparatus the system may be maintained under any desired pressure equal to, or greater than atmospheric, such pressure being created by the formation of hydrogen and other gases from the oil and being controlled by setting valve 14 so as to control the release of such vapors. The oil may be introduced through pipe 5 under a pressure equal to that prevailing within the system. A pressure gage 34 may be connected at any suitable point for indicating the pressure within the system.

One form of reaction chamber for effecting dissociation of the oil is illustrated in Figs. 3 to 5, and comprises a cylindrical vessel 36 having a conical bottom 37. Said vessel may be covered with suitable heat insulating material indicated at 20. Pipe 12 (or 33) enters the top of said vessel and projects downwardly a short distance into the vessel so as to maintain a vapor space 38 to prevent bumping. A manometer tube 39 may be connected to pipe 12 and to said vapor space so as to indicate by the difference in level therein any tendency of the oil in vessel 36 to rise above the bottom of pipe 12. Suitable means such as electric heating coil 40 may be provided for heating the main body of oil in the vessel 36 to a temperature above atmospheric but insufficient to produce appreciable vaporization of any constituents of the oil. The lead-in wires 41 and 42 for said heating coil may pass through suitable air tight insulating bushings 43. A thermometer well 44 may extend into the body of oil and may be filled with mercury or other suitable liquid in which a thermometer 45 may be inserted for indicating the temperature of the main body of oil.

A pair of rotating electrodes 46 formed preferably of carbon are mounted at the lower ends of shafts 47, which are rotatably mounted in insulating bushings 48 extending through a cover plate 49 at the top of vessel 36. Suitable packing means 50 are provided at the upper ends of insulating bushings 48, so as to provide a substantially air tight fit around shafts 47. Said shafts are preferably mounted so as to be inclined toward each other at their lower ends and may be provided with adjusting collars 51 by means of which they may be raised or lowered so as to vary the gap between electrodes 46. Suitable means are provided for rotating electrodes 46 in reverse directions, such means comprising, for example, an endless belt 52 extending over pulleys 53 on shafts 47 and over a drive pulley 54 on drive shaft 55 and also over an idler pulley 56 as shown in Figs. 3 and 4. Each of the shafts 47 may be provided with a contact ring 57, and suitable brushes 58 engage said contact rings and are connected by wires 59 to the secondary winding of step-up transformer 60 whose primary winding is connected by wires 61 to any suitable source of alternating current. The secondary voltage of transformer 60 may be any voltage suitable for use in the dissociation of oil to form carbon black according to my invention and may, for example, be from 10,000 volts or less to 100,000 volts or more.

The dissociation of the oil is carried out in the above described reaction vessel as follows:

The oil to be treated enters said reaction vessel through pipe 12 (or 29) and a body of such oil is maintained within the reaction vessel as indicated at 63. Electrodes 46 are set in rotation in the direction indicated in Fig. 5 and a suitable high potential difference is maintained between such electrodes so as to cause an arc to form between the opposing edges of the electrodes. Such arc, due to the rotation of the electrodes, tends to spread out as indicated by dotted lines at 65 so as to provide a sort of fan shaped dissociation zone of high temperature. The arc is drawn out until its resistance becomes so high that the voltage employed is no longer able to maintain the arc, when the arc is extinguished and a new arc is immediately established at the initial position in the gap between adjacent edges of the electrodes. It is thus seen that a comparatively restricted high temperature dissociation zone is provided, surrounded by a relatively large body of oil at a materially lower temperature than such dissociation zone.

The high temperature in the dissociation zone causes the oil immediately surrounding such zone to be dissociated mainly into carbon and hydrogen (together with small amounts of methane and light unsaturated gases). Due to the rotation of the electrodes a fresh supply of oil is continually drawn into the dissociation zone and the products of dissociation are disseminated substantially immediately upon their formation into the surrounding body of relatively low temperature oil. This movement of fresh oil toward the dissociation zone and of the reaction products out of the dissociation zone is also assisted by the convection currents produced in the body of oil due to heating the oil around the dissociation zone and by the agitation of the oil due to the escape of hydrogen and other gases upwardly therethrough from the dissociation zone.

The temperature in the dissociation zone itself is relatively high, for example, from approximately 2000° to 3000° F. while the temperature of the oil immediately surrounding such zone is much lower than this, as substantially the same temperature prevails throughout the entire body of oil outside the dissociation zone due to the continual agitation and circulation of such oil. A steep temperature gradient is thus provided between the oil and the arc and the actual dissociation of the oil into carbon and hydrogen therefore takes place only at the surface of the oil around the arc or throughout a very thin layer immediately surrounding the arc. In order therefore to increase the efficiency of production of carbon black for a given consumption of electrical energy it is advantageous to provide an arc having the maximum surface area for a given volume. This object is accomplished in the above apparatus by drawing the arc out in the form of a relatively thin fan shaped sheet. The surface of the arc may also be increased by operating under reduced pressure as hereinafter described.

The main body of oil in the reaction vessel may be heated to any desired temperature by passage of electric current through heating coil 40, or by applying heat to such oil in any other suitable manner. The temperature to which such body of oil is heated is indicated by thermometer 45, and is preferably the highest temperature to which the oil may be heated at the pressure prevailing in the reaction chamber, without causing appreciable vaporization thereof. This temperature, while it may in some cases be considerably above atmospheric temperature, is yet sufficiently below the high temperature of the dissociation zone to provide the above described cooling effect on the carbon black disseminated therein from the dissociation zone.

I will now describe the complete process of producing printing ink according to my invention, in the case in which a sub-atmospheric pressure or vacuum is maintained within the system, using the apparatus shown in Fig. 1. The oil to be used in the process is supplied to supply chamber 1 through pipe 5. Such oil may be any hydrocarbon or other carbon-bearing oil which is suitable for use as a vehicle for printing ink, which is sufficiently fluid for passage through the various parts of the apparatus, and which is susceptible to dissociation at high temperature to form carbon as a product of such dissociation. By operation of exhaust fan or vacuum pump 16, a suitable vacuum or subatmospheric pressure is maintained within the apparatus and the connection of equalizing pipes 23, 24 and 25 insures that such vacuum will be substantially uniform in the different parts of the apparatus. A sufficient quantity of oil is then passed from supply chamber 1 into reaction vessel 3 to provide the aforesaid body of oil in said reaction vessel. Such body of oil may then be heated by heating coil 40 to a suitable temperature say from 200 to 1200° F., and the arc is then established between the rotating electrodes 46 as above described.

The hydrogen and other gases produced by the resulting dissociation of oil at the surfaces of the arc passes upwardly through the body of oil into the space 38 and hence out through pipe 12 to scrubber 2, where it encounters the descending stream of oil in such scrubber. Any condensible constituents carried off with such gaseous products are thus condensed and absorbed in the oil and are returned to reaction vessel 3, while the gases themselves are discharged through pipe 17.

The carbon black formed at the surface of the dissociation zone, and immediately thereafter disseminated into the body of relatively cool oil, remains in suspension in the oil in a very finely divided state and as such oil is repeatedly circulated through the dissociation zone the proportion of carbon black in suspension therein gradually increases and this process may be carried out until a sufficient quantity of the oil has been dissociated to provide throughout the body of oil in the reaction vessel the proportions of carbon black required in printing ink, so that the entire charge of oil has been converted to printing ink. In general, however, I prefer to provide for slow but continual feeding of oil to the reaction vessel and slow but continual withdrawal of printing ink from the reaction vessel through pipe 18 into storage chamber 4. Since pipe 18 leads from the bottom of the reaction vessel it will be seen that the thickest portion of the charge in the reaction vessel, that is the portion containing the highest proportion of carbon black, is continually withdrawn therefrom. It is possible therefore by a proper regulation of valves 9 and 19 to maintain the rate of flow of oil into the top of the reaction vessel and of ink out of the bottom of such vessel such that the ink discharged therefrom contains a uniform and suitable proportion of carbon black. The storage chamber 4 is in this case provided chiefly for the purpose of permitting further mixing of the material discharged from the reaction vessel so as to correct any minor or momentary fluctuations or inequalities in the composition thereof. The mixed ink containing substantially the necessary proportion of carbon black finally passes through pipe 21 to any suitable point for further treatment, storage or shipment.

The vacuum which is maintained in the system will in general depend upon the volatility of the oil employed in the process and may vary, for example, from $\frac{1}{10}$ of an atmosphere absolute pressure in the case of a heavy or difficultly volatile oil to but slightly under atmospheric pressure in the case of a light or readily volatile oil. In some cases the process may be carried out entirely at atmospheric pressure as, for example, when working with an oil of such volatility that the use of reduced pressure would result in undue vaporization thereof at the temperature of the body of oil in the reaction chamber.

The process may also be carried out under super-atmospheric pressure using, for example, the apparatus shown in Fig. 2. The operations are in this case substantially the same as above described with the exception that valve 14 is so regulated as to cause the gaseous products formed by the dissociation of the oil to create the desired super-atmospheric pressure in the system and such pressure is as before maintained uniform throughout the system by means of equalizing pipes 23, and 25. In this case a sufficient charge of oil may be supplied to oil supply chamber 1 to last for a complete run of the process which is then carried out as a batch process, or the oil may be continually supplied to such supply chamber through pipe 5 under a pressure sufficiently greater than that maintained within the system to cause the desired flow of oil. By means of pre-heater 28 the oil passing from scrubber 2 to reaction chamber 3 may be heated substantially to the temperature of the body of oil in said reaction chamber so that the heating coil 40 may be dispensed with or may be utilized merely to supply to the oil sufficient heat to compensate for loss by radiation and the like.

I will now describe the other forms of reaction vessel shown in the drawings. The one shown in Figs. 6 and 7 comprises as before a cylindrical vessel 36 provided with a conical bottom 37 and adapted to hold a body of oil as indicated at 63. Such vessel is provided as before with pipes 12 (or 29) and 18 for supplying oil thereto and for conducting ink therefrom and may also be provided with heating coil 40. In this case, however, I have shown the rotating electrodes 46 as mounted with their axes vertical. The shaft 67 of one of said electrodes passes through stuffing box 68 and is provided at its outer end with a bevel gear 69 engaging bevel gear 70 on the shaft of motor 71 in such manner that rotation of said motor causes the corresponding electrode to be rotated at high velocity. The shaft 72 of the other electrode passes through an insulating bushing 73 and stuffing box 74 and is provided at its outer end with a contact ring 75. A contact brush 76 engages said contact ring and is connected by wire 77 to one side of the secondary winding of transformer 60, the other side of said winding being connected by wire 78 to the metallic wall of vessel 36 and hence through shaft 67 to the electrode 46 on said shaft. The insulating bushing 73 may be mounted on a sliding cover plate 79 so as to permit the corresponding electrode to be moved toward or away from the other electrode and vary the gap between such electrodes.

The operation of this form of reaction vessel is substantially the same as above described with the chief exception that only the electrode on shaft 67 is positively rotated, the other electrode being rotated only by the action of friction between the opposing surfaces of the electrodes and the body of oil therebetween. At the high velocity employed, such friction is sufficient to effectively impart rotative movement to said other electrode so as to produce as before a spreading of the arc for the purposes above described.

In the form of reaction vessel shown in Figs. 8 and 9 only one rotating electrode 81 is provided, said electrode having a rounded projecting end 82 and being mounted at the lower end of shaft 83 which passes through insulating bushing 84 and is driven by means of belt 85 engaging pulley 86 on said shaft. The other electrode comprises a fixed ring 87 surrounding electrode 81 in such manner that rotation of electrode 81 causes the projecting end 82 thereof to rotate at a fixed distance from the inner surface of contact ring 87. Means are provided as before for maintaining a high voltage between electrodes 81 and 87, the latter of which is grounded or connected to a metallic wall of vessel 36. In the operation of this form of reaction vessel an arc is formed between the projecting end of electrode 81 and the opposing portion of electrode 87, and as electrode 81 rotates while electrode 87 remains stationary such arc is drawn out until its resistance becomes so great that it can no longer be maintained, when such arc is broken and a new arc established in the same manner. A continual series of arcs are thus produced following one another in such rapid succession as to give substantially the effect of a continuous arc in the annular space between electrode 87 and the path of the projecting end of electrode 81. The oil is as before continually drawn into and through this arc or dissociation zone, and I prefer as shown to incline or taper the inner surface of electrode 87 and the end of electrode 81 inwardly toward the bottom of the reaction vessel so that the whirling movement imparted to the oil by rotation of electrode 81 also serves to draw the oil upwardly through the aforesaid dissociation zone. If desired, the electrode 81 may be provided with additional projections as at 82'.

In Figs. 10 and 11 I have shown a reaction vessel provided with means for maintaining a high temperature dissociation zone by means of an oxy-hydrogen flame or other high temperature flame. In this case an outer tube 90 and an inner tube 91 within said outer tube extend upwardly through the top of vessel 36 and are adapted to be rotated at high velocity by means of motor 92, belt 93 and pulley 94. Tube 90 opens at its upper end into chamber 95 to which oxygen or compressed air is supplied through pipe 96, while pipe 91 opens into chamber 97 to which hydrogen or other combustible gas is supplied through pipe 98. Tubes 90 and 91 are provided as shown with horizontal extensions at their lower ends which project radially in the vessel 36 and a burner head 99 is provided at the outer end of the radially projecting portions of said pipes. Said burner head is provided with passages 101 and 102 communicating respectively with tubes 90 and 91 and terminating in burner tips 103 and 104 for supplying oxygen and hydrogen respectively into intimate contact with one another. Means are preferably provided for igniting the resulting mixture of oxygen and hydrogen beneath the surface of the body of oil, such means comprising, for example, a pair of spark points 105 and 106. One of these points 105 may be grounded as through the walls of vessel 36, and the other may be connected as shown by an insulated wire 107 to contact ring 108 which is connected by brush 109 and wire 110 to one side of any suitable device for producing suitable high tension current for maintaining a spark between spark points 105 and 106, the other side of such source of current being grounded.

In the operation of this form of reaction vessel, a high temperature flame is maintained as indicated in dotted lines at 111, by combustion of the hydrogen and oxygen supplied through burner tips 103 and 104. In case such flame becomes extinguished it is immediately re-ignited by the spark between points 105 and 106. The pipes and burner are set in rotation at suitable velocity, so that the dissociation zone of high temperature is caused to move through the oil which as before is dissociated at the surfaces of this zone to form carbon black and hydrogen. The hydrogen produced by dissociation of the oil also burns in the flame, and the combustion products pass off through pipe 12.

Any of the above described reaction vessels may be utilized as the reaction vessel 3 in the apparatus shown in Figs. 1 and 2, the operation of the complete apparatus being substantially the same as described.

In some cases it may be found desirable to provide for more positive circulation of the oil through the dissociation zone and for more prolonged settling of the carbon from the oil between successive passages therethrough. Furthermore in some cases it may be impracticable to produce by direct dissociation in the reaction chamber a sufficiently high concentration of carbon black in the oil. I may therefore provide in such cases for removing oil with carbon black in suspension therein from the reaction chamber, subjecting such oil to a settling operation outside the reaction chamber to obtain a settled or thickened portion having substantially the composition of printing ink and a supernatant portion containing a relatively low proportion of carbon black and returning such oil containing a relatively low proportion of carbon black to the reaction chamber for dissociation of a further portion thereof.

Figure 12:
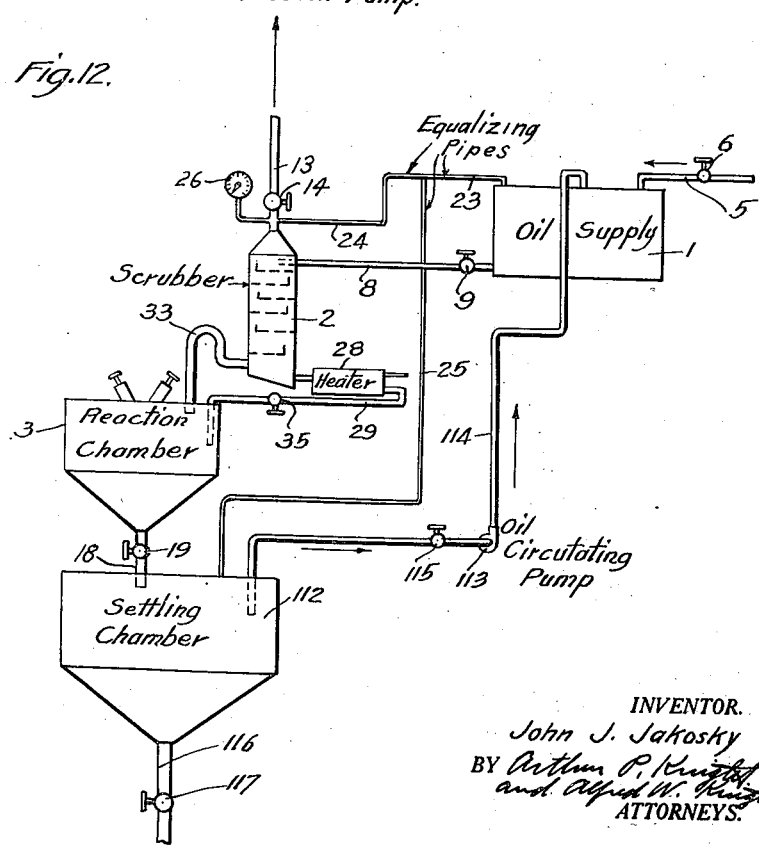
Figs. 12 and 13 are diagrammatic side elevations showing further modifications of the complete apparatus.

The apparatus shown in Fig. 12 may be used for carrying out the process in this manner. Such apparatus is substantially the same as that shown in Fig. 2 except that a settling chamber 112 is substituted for storage chamber 4, and pump 113 and pipe 114 controlled by valve 115 are provided for returning supernatant oil containing a relatively small proportion of carbon black to the oil supply chamber 1 where it is mixed with the incoming oil supplied through pipe 5 and is returned to the reaction chamber for further dissociation. Settling chamber 112 may be provided with outlet pipe 116 controlled by valve 117, for removal of the finished ink therefrom. In carrying out the process in this manner the rate of flow of the oil is so regulated by operation of valves 9, 35, 19, 115, and 117 that a continual supply of finished ink containing the desired proportion of carbon black is withdrawn from the bottom of settling chamber 112 through pipe 116. The oil passing from the reaction chamber 3 to settling chamber 112 does not contain sufficient carbon black to permit its use as ink, but the period of settling in said settling chamber is sufficient to provide a settled portion which does contain such necessary proportion of carbon black, while the upper or supernatant portion of the oil containing a relatively small proportion of carbon black is continually drawn off and returned by pump 113 to supply chamber 1.

Another modification of the process which is of advantage, when the oil to be used as a vehicle for the ink is so heavy as to interfere with the flow thereof through the several parts of the apparatus and the rapid circulation thereof in the reaction chamber, consists in mixing with this heavy oil a relatively light oil so as to increase the fluidity thereof, subjecting the mixture to thermal dissociation in the manner above described so as decompose portions of both the heavy and light constituents of the mixture to form carbon black and thereafter subjecting the mixture with the carbon black in suspension therein to a distilling operation to remove the remaining lighter oil therefrom and returning such lighter oil for mixture with a further quantity of heavy oil for use in the process. This method of operation may be carried out in the apparatus shown in Fig. 13 which is substantially the same as that shown in Fig. 12 but comprises in addition a still 119 of any suitable type, a pipe 120 controlled by valve 121 for conducting settled material from settling chamber 112 to said still, a condenser 122, a pipe 123 for conducting vapor from said still to said condenser, and a pump 124 and pipe 125 for returning condensed light oil from said condenser to tank 1 which in this case is adapted to serve both as a mixing and storage tank. Two feed lines 126 and 127 controlled respectively by valves 128 and 129 are provided for supplying to tank 1 the heavy oil which is to form the vehicle in the finished ink and the light oil for dilution thereof. Suitable agitating means 128 may be provided in tank 1.

In carrying out this modification of the process the heavy oil and light oil are introduced to tank 1 through pipes 126 and 127 respectively in such proportions as to produce a mixture of the desired fluidity, for example, a mixture containing equal parts of heavy and light oil, allowance being made, however, for the light oil returning through pipe 125 and also for the amount and composition of supernatant oil returned through pipe 114. The oil is thoroughly mixed in tank 1 and the resulting mixture is subjected to any of the above described operations for effecting thermal dissociation of the oil and producing a suspension of carbon black in the oil, including if desired a settling operation in chamber 112 and the return of the less concentrated portion through pipe 114 to tank 1. The suspension of carbon black in the oil, or the settled portion thereof if a settling operation be employed, passes through pipe 120 to still 119, wherein it is heated to a sufficient temperature and for a sufficient length of time to vaporize substantially all of the remaining light oil, which is collected in condenser 122 and returned through pipe 125 to tank 1, while the heavy oil containing substantially the necessary proportion of carbon black for use as printing ink is drawn off continually or intermittently from the still through pipe 118.

Figures 13, 14:
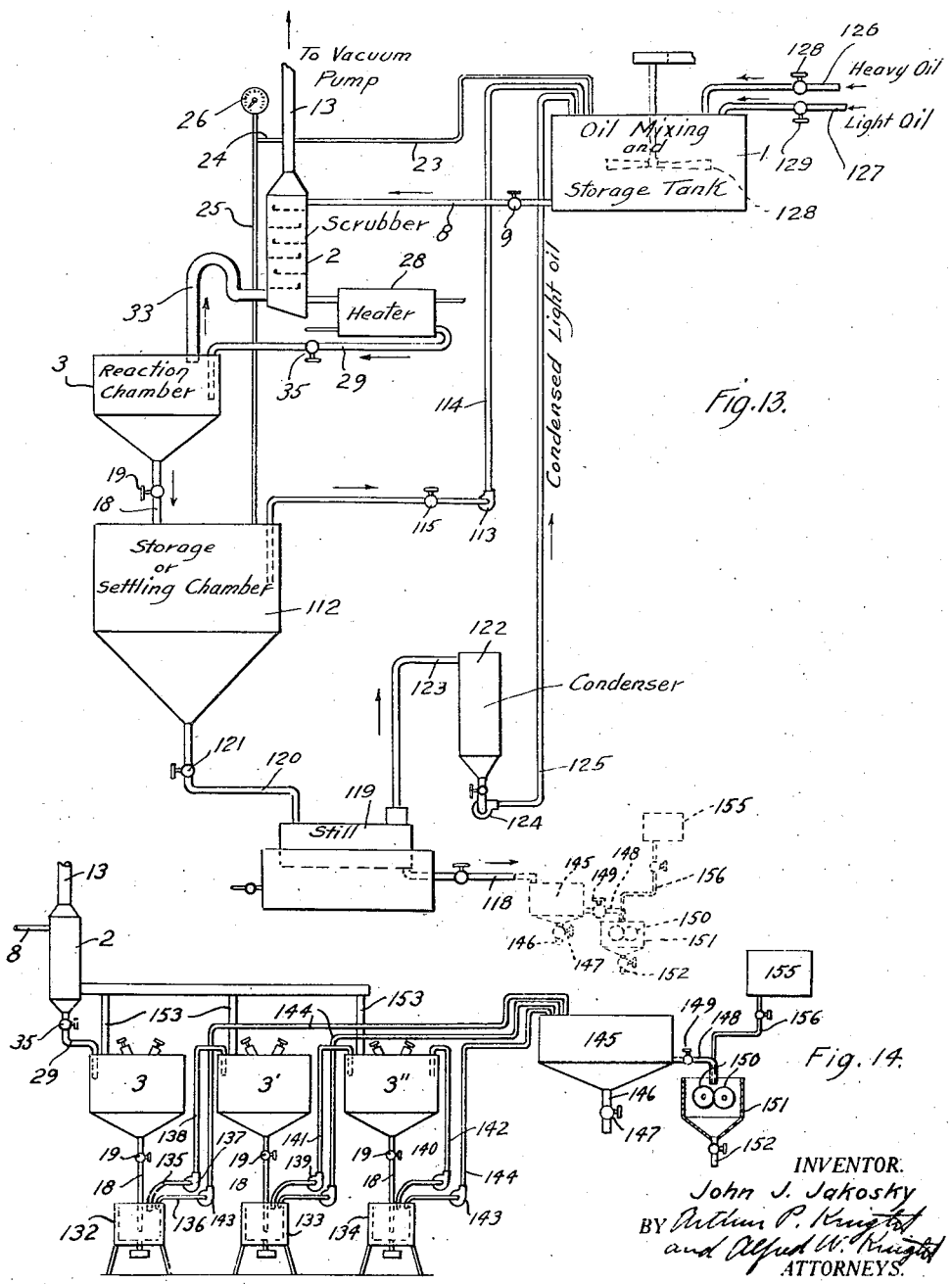
Fig. 14 is a diagrammatic side elevation of another modification of a complete apparatus.

Another arrangement of apparatus suitable for carrying out my invention is illustrated diagrammatically in Fig. 14. A series of reaction vessels 3, 3' and 3" are provided, which are connected by pipes 18 to centrifugal separators 132, 133, and 134 respectively. Pipe 29 leads from scrubber 2 to the first vessel 3 for supplying thereto the oil to be treated. Each of the separators is provided with two discharge pipes 135 and 136, for the lighter and heavier fractions, containing respectively low and high percentages of carbon black. The lighter material from separator 132 is passed by pump 137 and pipe 138 to the second reaction vessel 3', while the lighter fractions from the separators 133 and 134 are passed, by pumps 139 and 140 and pipes 141 and 142 respectively, to the third reaction vessel 3". The heavier fractions from all the separators are passed through pumps 143 and pipes 144 to storage chamber 145. Said storage chamber may be adapted to serve as a settling chamber or separator for removal of any heavy particles such as grit, and a drain pipe 146 controlled by valve 147 may be provided at the bottom of said chamber, through which such heavy material may be withdrawn from time to time. Pipe 148 controlled by valve 149 leads from somewhat above the bottom of chamber 145 to a pair of rotating milling rolls 150 for breaking up any large lumps of carbon black so as to produce a smooth ink. The material passing through the rolls collects in tank 151 and is conducted through pipe 152 to any suitable point for storage or any other purpose. Pipes 153 conduct the hydrogen and other gases from the reaction vessels to scrubber 2.

In carrying out the process in this apparatus the oil passes first to vessel 3 wherein a portion of it is dissociated to form carbon black. The oil with such carbon black in suspension therein then passes to separator 132, wherein it is separated into a heavier fraction containing substantially the correct proportion of carbon black for use as ink and a lighter fraction containing a smaller proportion of carbon black. The heavier fraction passes to chamber 145 and the lighter fraction to the next reaction vessel 3' where a further portion of carbon black is formed. The material from this reaction vessel is again separated in separator 133, the heavier portion passing as before to chamber 145 and the lighter portion to the next reaction vessel 3". The process is again repeated, with the exception that the lighter portion from separator 134 is returned to the same reaction vessel 3" for further treatment. The oil passing to chamber 145 therefore contains the proportion of carbon black required for ink.

Any heavy particles, such as pieces of carbon from the elecetrodes, grit, or other foreign matter, is permitted to settle to the bottom of chamber 145, while the finished ink, free from such foreign substances, passes to the milling rolls 150 in which any lumps of carbon black are broken up and a smooth ink of uniform consistency is produced.

The main distinctions between this modification of the invention and the others above described are that the oil passes successively through a series of dissociation zones or reaction vessels, with a separation of a more concentrated portion thereof between successive passages, instead of repeatedly passing through the same dissociation zone or reaction vessel, and that the separation of the more concentrated portion is effected by means of a centrifuging operation rather than by gravitative settling. Such centrifuging operation has the advantages of more perfect and rapid separation and conservation of space required and in some cases may be preferable to the use of settling tanks.

It will of course be understood that the centrifugal separating means shown in Fig. 14 may be substituted for the gravity separating means shown in any of the other figures, or that the gravity separting means may be used instead of the centrifugal means with the apparatus shown in Fig. 14. It will be also understood that the means shown in Fig. 14 for separating grit or heavy particles from the ink, and also the milling rolls 150, may be used in conjunction with any of the other forms of apparatus. For example, as indicated in dotted lines in Fig. 13, the discharge pipe 118 may, if desired, lead to a settling chamber 145, provided with an outlet pipe 146 at the bottom for removal of settled heavy material and a pipe 148 in its side for removal of ink freed from such material; and a pair of milling rolls 150 may be provided for treating the ink drawn off through pipe 148 so as to break up any lumps of carbon black in the ink.

For some purposes the material produced by any of the methods above described may be used directly as printing ink, while for other purposes it may be necessary to add certain other ingredients, such as higher grade oils, dryers, varnishes, or the like in order to obtain an ink of the desired grade. Such other ingredients may be added in any suitable manner; for example, as shown in Figs. 13 and 14, such an ingredient may be placed in tank 155 and may be supplied through pipe 156 to the milling rolls 150 along with material supplied through pipe 148, so as to be mixed therewith during the milling operation.

It will be, of course, understood that in any of the processes above described the exact composition of the final product may vary somewhat, from time to time, above or below the required composition of printing ink, but such minor fluctuations are compensated for by mixing obtained in the storage tank 4 or in other storage or mixing means into which the ink may be conducted for this purpose.

I claim:

1. The process of making printing ink which comprises subjecting a carbon-bearing oil suitable for use as a vehicle in printing ink to a high temperature in a localized zone to effect dissociation of a portion thereof into carbon black and gaseous products, causing the carbon so produced to be immediately removed from said zone and disseminated into the undissociated oil surrounding said zone, continuing such treatment until a portion at least of such oil contains a sufficient proportion of carbon black for use as printing ink, and removing the oil containing such proportion of carbon black.

2. The process of making a printing ink which comprises maintaining a body of carbon-bearing oil suitable for use as a vehicle for printing ink, establishing a localized zone of high temperature within said body of oil, causing such oil to circulate in such manner as to continually bring fresh portions thereof into contact with such high temperature zone to cause dissociation thereof into carbon black and gaseous products and to continually remove such carbon black and gaseous products of dissociation from said zone into said body of oil substantially immediately after their formation, removing the gaseous products from the oil, continuing such treatment until at least a portion of the oil contains a sufficient proportion of carbon black for use as printing ink, and removing from the process oil containing such proportion of carbon black.

3. A process as set forth in claim 2, heat being also supplied to said body of oil outside the high temperature zone to maintain the same at a temperature above atmospheric but sufficiently below that of the high temperature zone to substantially immediately cool the carbon black removed from the high temperature zone into said body of oil to a low enough temperature to prevent harmful changes in the properties thereof.

4. The process of making printing ink which comprises subjecting a carbon-bearing oil suitable for use as a vehicle in printing ink to a high temperature to effect dissociation of a portion thereof into carbon black and gaseous products, causing the carbon black so produced to be disseminated into the undissociated oil, subjecting oil containing such carbon black so disseminated therein to a settling operation, separating a settled portion of such oil containing substantially the proportion of carbon black required for use as printing ink and returning the remainder of such oil containing a relatively small proportion of carbon black to further high temperature dissociation for the formation of an additional quantity of carbon black.

5. The process of making printing ink which comprises forming a mixture of a relatively heavy carbon-bearing oil suitable for use as a vehicle in printing ink and a relatively light carbon-bearing oil, subjecting such mixture to a high temperature to effect dissociation of portions thereof into carbon black and gaseous products, causing the carbon black so produced to be disseminated into the undissociated mixture, subjecting such mixture containing such carbon black so disseminated therein to a distilling operation to vaporize undissociated relatively light oil therefrom and leave a suspension of carbon black in relatively heavy oil, condensing the vaporized lighter oil and returning the condensed light oil for mixture with a further quantity of relatively heavy oil for use in the above process.

6. The method of producing carbon black in suspension in oil which comprises maintaining a body of carbon-bearing oil, establishing a localized zone of high temperature within said body of oil, causing such oil to circulate in such manner as to continually bring fresh portions thereof into contact with such high temperature zone to cause dissociation thereof to form carbon black and gaseous products and to continually remove such carbon black and gaseous products of dissociation from said zone into said body of oil, and removing the gaseous products from the oil, while supplying heat to said body of oil in addition to heat received thereby from said high temperature zone in sufficient amount to maintain such body of oil at a temperature materially above atmospheric temperature but sufficiently below the temperature of said high temperature zone to prevent harmful changes in the properties of the carbon black after dissemination in said body of oil.

7. A process as set forth in claim 6, said body of oil being maintained under a pressure only slightly in excess of the vapor pressure of the most volatile constituent of the oil at the temperature at which said body of oil is maintained.

8. A process as set forth in claim 6, said body of oil being maintained under a pressure below atmospheric pressure but slightly in excess of the vapor pressure of the most volatile constituent of the oil at the temperature at which the body of oil is maintained.

9. The process of forming carbon black in suspension in oil which comprises maintaining a body of carbon-bearing oil, establishing a localized zone of high temperature within said body of oil, causing such oil to circulate so as to bring portions thereof into contact with such high temperature zone to cause dissociation thereof into carbon black and gaseous products and to continually remove such carbon black and gaseous products of dissociation from said zone into said body of oil, and removing the gaseous products from the oil, while maintaining said body of oil under a pressure only slightly greater than the vapor pressure of the most volatile constituent of the oil at the temperature at which such body of oil outside said high temperature zone is maintained.

10. A process as set forth in claim 9, said pressure being below atmospheric pressure.

11. An apparatus for producing a suspension of carbon black in an oil, comprising a reaction chamber adapted to contain a body of oil, means for supplying oil to such reaction chamber, means in said chamber and beneath the surface of the body of oil therein for maintaining a localized zone of high temperature within said body of oil, additional means for supplying heat to said body of oil in the reaction chamber, but outside said high temperature zone to heat the same to a temperature above atmospheric but below the temperature of such high temperature zone, and outlet means at the lower portion of said reaction chamber, said reaction chamber being of sufficient size relative to the size of said high temperature zone to permit repeated circulation of the oil therein through said high temperature zone.

12. An apparatus for producing carbon black comprising a reaction chamber adapted to contain a body of oil, means for mixing a relatively heavy oil and a relatively light oil, means for supplying such mixture to said reaction chamber to maintain said body of oil therein, means for maintaining a localized zone of high temperature within said body of oil to produce carbon black in suspension in such oil, means for withdrawing material from the lower portion of said reaction chamber, means for subjecting material so withdrawn to a distilling operation to vaporize constituents of said relatively light oil, means for condensing such vaporized constituents, and means for supplying such condensed material together with said mixture of relatively light and relatively heavy oil to said reaction chamber.

13. The process of making printing ink, which comprises subjecting a carbon-bearing oil suitable for use as a vehicle in printing ink to a high temperature to effect dissociation of a portion thereof into carbon black and gaseous products, causing the carbon black so produced to be disseminated into the oil, subjecting oil containing such carbon black so disseminated therein to a separating operation to separate the same into a portion containing substantially the requisite proportion of carbon black for printing ink and a portion containing a smaller proportion of carbon black, and subjecting the latter portion to further high temperature dissociation for the formation of additional carbon black.

In testimony whereof I have hereunto subscribed my name this 25th day of October, 1926.

JOHN J. JAKOSKY.